INVENTOR.
Louis H. Gauss
BY Walter S. Zebrowski
ATTORNEY

INVENTOR.
Louis H. Gauss
BY Walter S. Zebrowski
ATTORNEY

United States Patent Office 3,417,331
Patented Dec. 17, 1968

3,417,331
RESISTANCE MEASURING APPARATUS INCLUDING VOLTAGE CHARGING AND DISCHARGING MEANS IN THE INDICATOR PORTION
Louis H. Gauss, Jr., Penndel, Pa., assignor to Corning Glass Works, Corning, N.Y., a corporation of New York
Filed Jan. 4, 1966, Ser. No. 518,625
7 Claims. (Cl. 324—62)

ABSTRACT OF THE DISCLOSURE

An electrical circuit for determining the resistance of an electrically powered resistance element in order to derive its temperature. The circuit includes a voltage detector, a means for sampling the voltage appearing across the resistance element at an instant when current flow through the element has a predetermined value, and a means for applying the voltage to the detector whereby the resistance and temperature of the element is determined.

---

Electrical heating elements may fail prematurely during operation at excessive temperatures in furnaces, ovens, melting units or similar thermal environments. The excessive temperature at which such elements fail is called the burnout temperature. Different heating elements have different burnout temperatures depending upon the materials from which they are constructed. A platinum or platinum alloy heating element may have a burnout temperature of about 1600° C. for example. The loss of such an element because of operation at an excessive temperature is both inconvenient and expensive. Heating elements are frequently placed in locations within ovens, furnaces or melting units which are accessible with difficulty. Therefore, to insure long life, minimize incidents of premature failure, and reduce losses of time and money, it is highly desirable that heating elements be operated at safe operating temperatures, below their burnout temperatures. Such a temperature for a platinum heating element is about 1500° C., for example.

In many thermal environments, including those briefly mentioned above, heating elements are located such that an accurate determination of their temperature is impossible. Some heating elements are immersed in molten material, others are purposely located as far as possible from material being processed so that temperature sensors placed in the material will not yield false indications. Frequently, both heating elements and temperature sensors are shielded and protected from damaging environments by sheaths of thermal insulating material. Some sensors are separated from heating elements by interposed material having poor thermal conductivity. For these and other reasons the thermal lag between a temperature sensor and a heating element may approach several hundred degrees or more during heating and cooling opeations, and as much as twenty or thirty degrees during steady state conditions.

The measurement of operating temperature of electrical heating elements is further complicated by the use of alternating current to power such elements. It is well known that electrically conductive materials such as are used for heating elements have measurable temperature coefficients of resistance. Consequently, their temperatures may easily be determined if their resistances can be measured. Ordinary resistance measurement techniques rely upon instruments which deliver a carefully controlled, low voltage, direct current to an inert resistance element. Current drawn by the element is measured, and the resistance thereof may be determined by Ohm's law. Frequently, such instruments have dial scales calibrated directly in ohms.

Resistance measurement of an element which is being powered by varying alternating current, and which may be constantly undergoing resistance changes because of temperature variations, presents an altogether different, and heretofore unsolved, problem.

It is accordingly an object of the present invention to provide a means for measuring the electrical resistance of a resistance element powered by alternating current.

Another object of the present invention is to provide a means for detecting unsafe operating temperatures in heating elements having known temperature coefficients of resistance.

Still another object of the present invention is to provide a means for warning a human operator when the maximum safe operating temperature of a resistance heating element has been reached.

A further object of the present invention is to provide a means for improved control of thermal processes in which thermal lag may present particular problems.

A still further object of the present invention is to provide a means for detecting slight changes and variations of viscosity or composition in a molten material, such as glass for example, in apparatus wherein such material acts as a resistance element.

These, together with other objects, features and advantages of the present invention will be more readily understood from the following detailed description and the drawings.

As is well known to those familiar with the art, electrically conductive materials have unique, measurable, temperature coefficients of resistance. In accomplishing the foregoing objects of the present invention there is provided an electrical circuit for determining the electrical resistance of an operating resistance element powered by alternating current. Said circuit comprises: a voltage detector, a means for sampling the voltage appearing across said resistance element at an instant when current flow through said element has a predetermined value, and a means for applying said voltage to the detector in such a manner that resistance and temperature of the resistance element may be determined.

Figure 1:
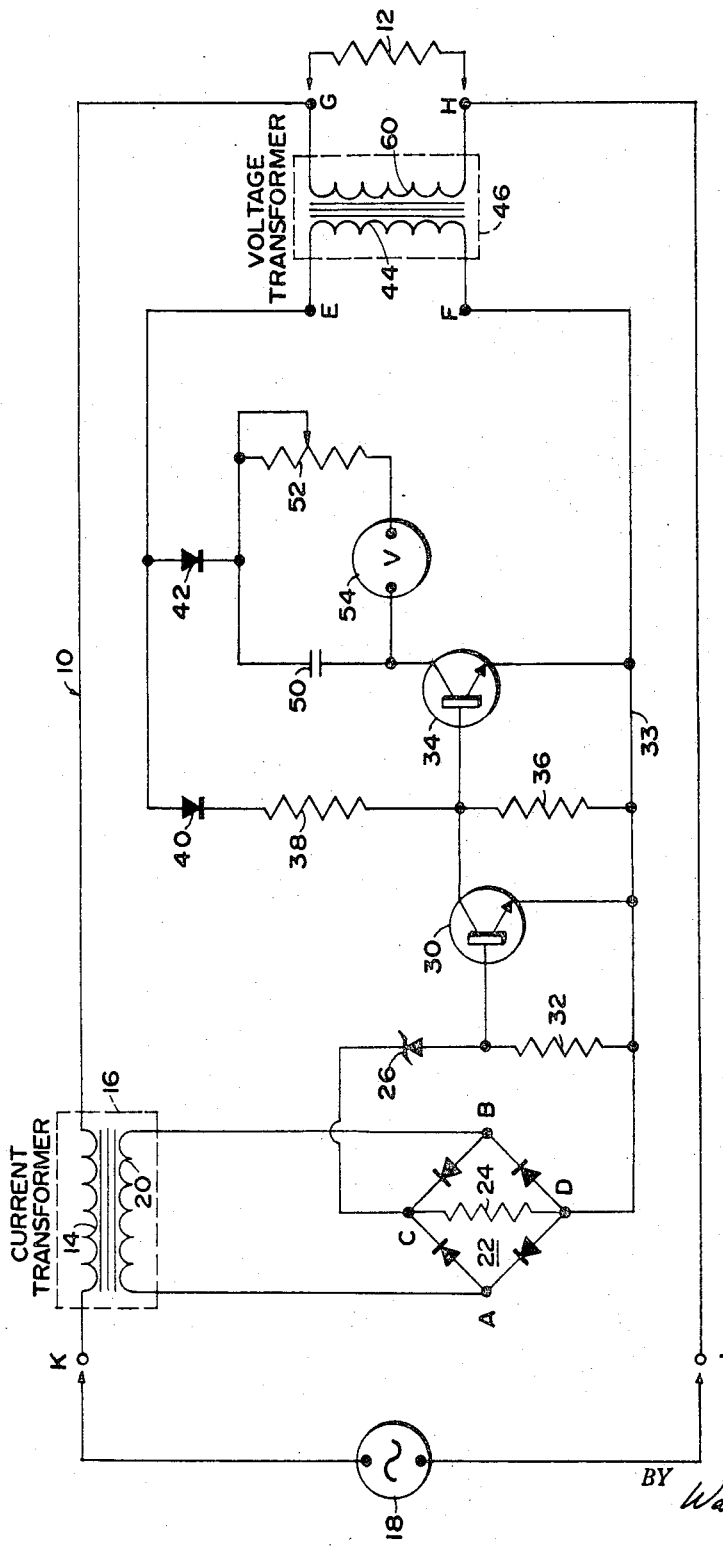
FIGURE 1 is a schematic diagram of an electrical circuit in accordance with one embodiment of the present invention.

In circuit 10 of FIGURE 1 resistance element, or load 12, is connected in series with primary winding 14 of current transformer 16 and alternating current source 18. Such connection may be conveniently made at circuit terminals G and H for example. When the load, or resistance element, is connected to the circuit in the manner shown, load current will also flow in the primary winding of transformer 16, inducing a proportional current in secondary winding 20 thereof. Source 18 may be a programmed, controller-operated, power supply; commercial power mains; a regulated power supply, or other like source of alternating current; and may be conveniently attached to points J and K of circuit 10. Current transformer 16 is capable of providing a secondary winding current which bears a direct relationship, or ratio, to the transformer's primary winding current, despite the variation of input voltage. Suitable primary to secondary current ratios may be 200 to 1, 100 to 1, 50 to 1, or the like, depending upon circuit requirements. Such ratios are obtained by proper selection of turns in the primary and secondary windings. The resistance element, or load, may be a resistor or a heating element winding for example, but is not limited thereto. Heating element windings are commonly made from electrically conductive materials such as platinum, platinum alloys, tungsten and the like. The present invention requires that the load have a temperature coefficient of resistance other than zero. Materials having either positive or negative temperature coefficients may be used successfully with the present invention. Platinum alloy heating elements commonly have resistances which vary between about one ohm at room temperature, or about 25° C., and five ohms at about 1600° C., for example. The present invention is well suited for use with such an element. At any given value of resistance the temperature of a heating element may be raised by increasing power input thereto, or it may be lowered by decreasing or removing power input. Under conditions of constant input voltage such an element will obviously draw a current proportional to its resistance.

Secondary winding 20 of the current transformer is connected across input terminals A and B of a rectifier such as full wave rectifier 22, for example. During each cycle of alternating current, two positive pulses of direct current appear at point C, travelling in the direction from D to C. These pulses produce a voltage drop across resistor 24, connected between rectifier output terminals C and D, which is directly proportional to the magnitude of the current and resistance.

Figure 2:
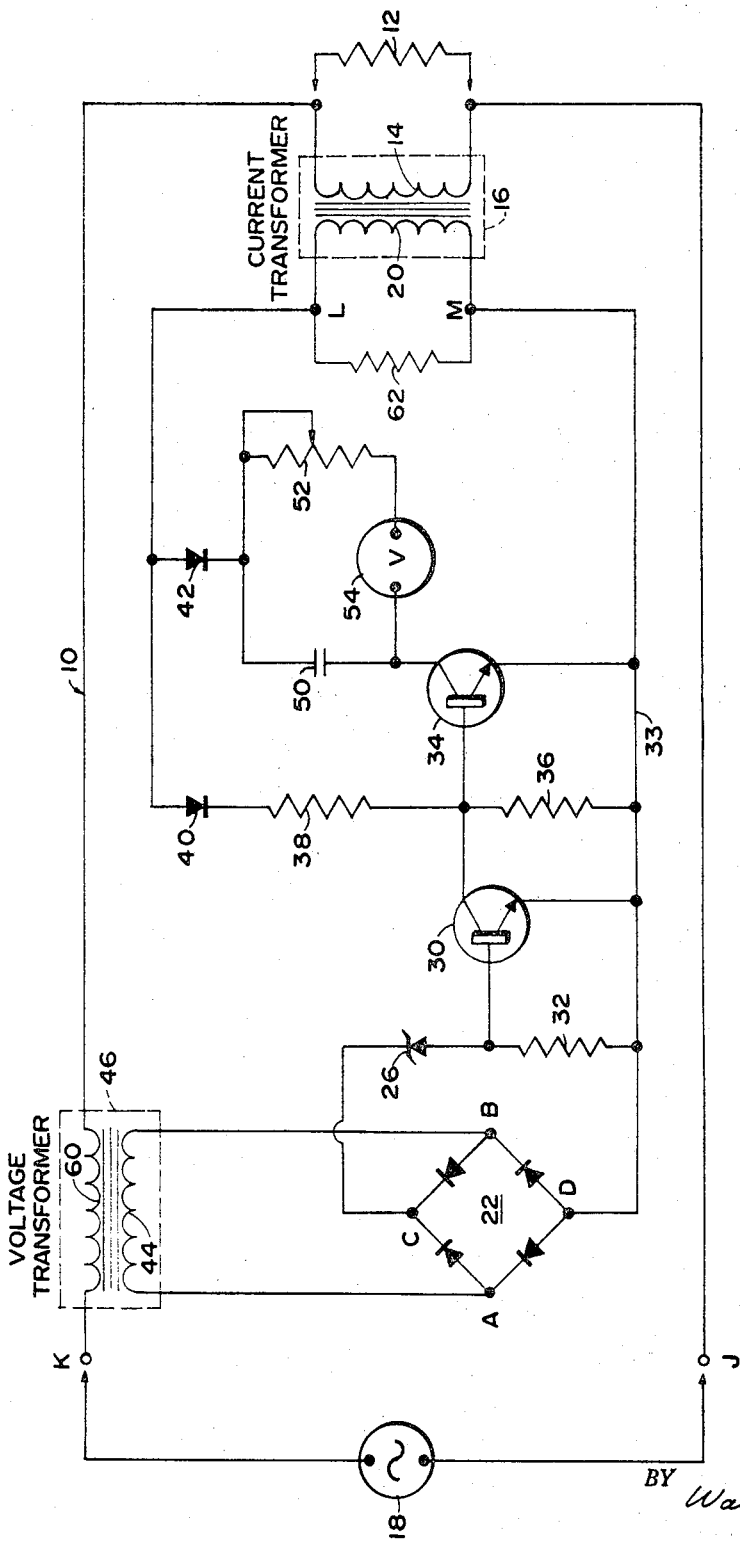
FIGURE 2 is a schematic diagram of an electrical circuit in accordance with another embodiment of the present invention.

A normally unidirectional current conductor, such as is shown by Zener diode 26, is connected between point C of the rectifier and the control electrode of a gating device, shown in FIGURES 1 and 2 as transistor 30, having base (control), collector and emitter electrodes. The Zener diode has a conductivity threshold sensitive to applied voltage, so that when its breakdown, or threshold, voltage is exceeded, reverse current will be conducted through the diode in a direction opposite the normal direction of current flow. Resistance element 32 connected between the base electrode of transistor 30 and common lead 33, acts as a bias resistor for transistor 30 which is non-conductive in the absence of reverse current flow through Zener diode 26. The conditions under which reverse current will flow may be predetermined by proper selection of the transformer 16 ratio, resistor 24 and the Zener diode 26 breakdown voltage. As an example, appropriate selection of these components may be made to cause reverse current to flow through Zener diode 26 when the load current reaches 5 amperes. When reverse current flows, a voltage is developed across bias resistor 32 causing transistor 30 to become conductive.

Zener diode 26 and transistor 30 thus comprise a portion of a switching device to be more fully described hereinafter. The emitter electrode of transistor 30 is connected to common lead 33 and the collector electrode is connected to the base electrode of a second gating device shown as transistor 34. Bias resistor 36 connects the base electrode of transistor 34 to common lead 33 and to the collector electrode of transistor 30 which is also connected by means of resistor 38 to the cathode of a unidirectional conducting element shown as diode 40. Diode 40 provides a voltage of such polarity and magnitude that when transistor 30 is in a non-conductive state, transistor 34 is conductive, and vice versa. The anodes of diodes 40 and 42 are connected together, and to terminal E, to which one end of secondary winding 44 of voltage transformer 46 is connected. The other end of secondary winding 44 is connected to terminal F of the circuit and to common lead 33. The cathode of diode 42 is connected by capacitor 50, to the collector electrode of transistor 34, whose emitter electrode is returned to common lead 33. An adjustable resistor 52 is connected in series with a voltage detector, such as meter 54, and capacitor 50, thereby forming an R-C network. Primary winding 60 of voltage transformer 46 is connected across load 12. Transformer 46 is a potential transformer which provides a secondary voltage proportional to its primary, or load, voltage.

In FIGURE 2, current transformer 16 and voltage transformer 46 have been interchanged with respect to their relative circuit locations as shown in FIGURE 1. Resistor 24 has been removed from the rectifier output terminals and a corresponding resistor 62 has been placed across the secondary winding of the current transformer at points L and M. Such a rearrangement of the above-identified circuit components permits the present invention to measure resistance by determining load current at an instant when load voltage has a predetermined value.

In still another embodiment of the present invention terminals G and H of FIGURE 1 may be connected to separate electrodes immersed in an electrically conductive molten material having a temperature coefficient of resistance other than zero, such for example, as molten glass. Resistor 52 is then adjusted to provide an indication proportional to load temperature on meter 54. If the temperature and viscosity of the molten material remain constant the indication will remain steady. If the temperature and/or viscosity of the molten material changes, however, such a change will be indicated by the meter. In this embodiment, the present invention is used to provide information about the change of resistance in a load, rather than the absolute magnitude of the resistance itself, although such may be readily calculated.

These are but a few of many possible embodiments of the present invention, and as such as intended only as illustrations and not limitations. Many other embodiments of this invention may be visualized by one familiar with the art.

In the circuit of FIGURE 1, during a positive voltage portion of the alternating current cycle when terminal E is positive with respect to terminal F, current flows through diode 40, resistor 38 and bias resistor 36, turning transistor 34 on and connecting capacitor 50 across secondary winding 44. Simultaneously, current will flow from point E through diode 42, charging capacitor 50 to a voltage proportional to load voltage.

Whenever load current exceeds a predetermined value, such as 5 amperes for example, transistor 30 becomes conductive short circuiting bias resistor 36 and causing transistor 34 to become reverse biased and non-conductive. Under these conditions, capacitor 50 is disconnected from secondary 44 at the instant that transistor 34 becomes non-conductive.

Thus, transistor 34 is turned off once each cycle at an instant when the load current is at the predetermined value. Capacitor 50 then discharges slowly through resistor 52, placing a voltage across meter 54. Meter 54 may be a D.C. voltmeter for example, and its scale may indicate volts or may be calibrated in ohms. Other voltage sensitive devices may be substituted in place of a voltmeter. Neon lamps, alarm bells, relays, and the like are satisfactory if only a warning rather than knowledge of voltage magnitude is desired. During the next cycle when transistor 30 is non-conductive because load current, hence Zener voltage, is too low to turn it on, transistor 34 again switches capacitor 50 to terminals E and F of the circuit and across the secondary winding of the voltage transformer, thus permitting the capacitor to recharge. If the alternating current supply frequency is sixty cycles per second, then sixty times each second the capacitor is charged to a voltage proportional to load voltage when load current is at its predetermined value, such as five amperes, for example.

If under these circumstances load resistance is two ohms, then by Ohm's law the load voltage must be 10 volts. If meter 54 has been given a scale which covers a numerical range of zero to ten, then adjustable resistor 52 may be adjusted to provide an indication of "two" on the meter scale, corresponding to a load resistance of two ohms. Should the heating element temperature increase sufficiently to double the load resistance to four ohms, the voltage will increase to twenty volts and capacitor 50 will charge to this value, causing the meter to read "four" as the capacitor is discharged therethrough. It is apparent that circuit voltage is unimportant except that it be sufficient to activate transistor 30. If breakdown voltage is not achieved at Zener diode 26, transistor 30 will remain off, or non-conductive, leaving transistor 34 in a conductive condition, and the meter will then follow process, or load, voltage. Diodes 40 and 42 serve to protect the transistors from voltages of opposite polarity which occur on alternate half cycles, that is when terminal E is negative with respect to terminal F.

The above-described embodiment of the present invention as shown in FIGURE 1 thus operates as a switch for measuring a voltage proportional to load voltage at the instant a predetermined current flows through the load, providing a linear resistance-voltage relationship.

Refer now to the circuit of FIGURE 2 which represents a different embodiment of the present invention. During a positive voltage portion of the alternating current cycle when terminal L is positive with respect to terminal M, a current flows through diode 40, resistor 38 and bias resistor 36, turning on transistor 34, which connects capacitor 50 across secondary winding 20 of transformer 16, and simultaneously, across resistor 62. Capacitor 50 is charged to the voltage appearing across resistor 62, which voltage is proportional to the load current. When the load voltage reaches and exceeds a predetermined value, reverse current flows through Zener diode 26, turning on transistor 30 which short circuits bias resistor 36 causing transistor 34 to become non-conductive. Under these conditions capacitor 50 is disconnected from secondary 20 at the instant transistor 34 becomes non-conductive. Thus, transistor 34 is turned off once each cycle at an instant when the load voltage is at a predetermined value. Capacitor 50 then discharges slowly through resistor 52, placing a voltage proportional to load current across meter 54.

This embodiment of the present invention thus operates as a switch for measuring a voltage proportional to load current at the instant a predetermined voltage appears across the load.

In a typical example of the present invention, the following components and values may be employed in FIGURE 1, but are not intended to represent limiting values:

Load 12—25 ampere; 120 volt; platinum wound heating element
Current transformer 16—250:1 turns ratio
Power supply 18—120 volt; 60 cycle, 30 ampere circuit
Rectifier 22—1N4001 (4 are used)
Rectifier resistor 24—270 ohms, 5 watts
Zener diode 26—1N935
Transistor 30—NPN type 2N3053
Transistor 34—NPN type 2N3053
Bias resistor 32—6.2 ohms
Bias resistor 36—620 ohms
Resistor 38—3000 ohms
Diode 40—type 1N4001
Diode 42—type 1N4001
Voltage transformer 46—6:1 turns ratio
Capacitor 50—100 microfarads at 50 volts
Adj. resistor 52—200,000 ohms
Voltmeter 54—50 microampere movement.

The range of primary voltage may vary between about 40 and 120 volts, and the primary current may vary between about 10 and 30 amperes during normal circuit operation.

Although the present invention has been described with respect to specific details of certain embodiments thereof, it is not intended that such details be limitations upon the scope of the invention except insofar as set forth in the following claims.

I claim:
1. An electrical circuit for determining the resistance of an electrically powered resistance element comprising circuit input and output terminals, said circuit input terminals being adapted for connection across an alternating current source,
a current transformer having the primary thereof serially connected intermediate one circuit input and one circuit output terminal,
means for connecting the other circuit input terminal to the other circuit output terminal,
a resistor,
a rectifier means having a pair of input terminals and a pair of output terminals, with the input terminals thereof being connected across the secondary winding of said current transformer, and the output terminals thereof being connected together by said resistor,
a switching means connected to one output terminal of said rectifier means,
a normally unidirectional current conductor, having a reverse current conductivity threshold sensitive to voltage, connected intermediate the other output terminal of said rectifier and said switching means, said switching means being responsive to reverse current flow through said conductor,
a voltage indicator,
an adjustable resistance element connected in series with said voltage indicator,
a voltage transformer having a primary winding thereof connected across said circuit output terminals, said circuit output terminals being adapted for connection across said powered resistance element, and
a voltage charging and discharging means alternately electrically connected by said switching means to the secondary winding of said voltage transformer and said voltage indicator, such that said voltage charging and discharging means is electrically connected to the secondary winding of said voltage transformer only during the positive voltage portion of an input alternating current cycle until a predetermined value of current at the circuit output terminals is reached whereupon said voltage means is then electrically connected to said voltage indicator.

2. The circuit of claim 1 wherein said normally unidirectional current conductor is a Zener diode.

3. The circuit of claim 2 wherein said switching means comprises a pair of transistors, each having base, collector and emitter electrodes, with said emitter electrodes being connected to said one output terminal of said rectifier means, and said transistors being direct coupled and biased so that one transistor is conductive while the other is non-conductive.

4. The apparatus of claim 3 wherein said voltage charging and discharging means comprises an R-C network having at least one resistor and a capacitor connected in series with said voltage indicator.

5. The apparatus of claim 4 wherein said rectifier means is a fullwave rectifier.

6. The apparatus of claim 3 wherein each of said transistors have one diode connected in series with each respective collector electrode thereof.

7. An electrical circuit for determining the resistance of an electrically powered resistance element comprising circuit input and output terminals, said circuit input terminals being adapted for connection across an alternating current source,
a voltage transformer having a primary thereof serially connected intermediate one circuit input and one circuit output terminal,
means for connecting the other circuit input terminal to the other circuit output terminal,
a rectifier means having a pair of input terminals and a pair of output terminals, with the input terminals thereof being connected across the secondary winding of said voltage transformer,
a switching means connected to one output terminal of said rectifier means, a normally unidirectional current conductor, having a reverse current conductivity threshold sensitive to voltage, connected intermediate the other output terminal of said rectifier and said switching means, said switching means being responsive to reverse current flow through said conductor, a voltage indicator, an adjustable resistance element connected in series with said voltage indicator, a resistor, a current transformer having the primary winding thereof connected across said circuit output terminals and having said resistor connected across the secondary winding thereof, said circuit output terminals being adapted for connection across said powered resistance element, and a voltage charging and discharging means alternately electrically connected by said switching means to the secondary winding of said current transformer and said voltage indicator, such that said voltage charging and discharging means is electrically connected to the secondary winding of said current transformer only during the positive voltage portion of an input alternating current cycle until a predetermined value of voltage at the circuit output terminals is reached whereupon said voltage means are then electrically connected to said voltage indicator.

No references cited.

ARCHIE R. BORCHELT, *Primary Examiner.*

E. E. KUBASIEWICZ, *Assistant Examiner.*

U.S. Cl. X.R.

324—111